US012027775B2

(12) United States Patent
Cheng

(10) Patent No.: US 12,027,775 B2
(45) **Date of Patent: *Jul. 2, 2024**

(54) METHOD AND APPARATUS FOR MILLIMETER WAVE ANTENNA ARRAY

(71) Applicant: Tensorcom, Inc., Culver City, CA (US)

(72) Inventor: Guang-Fu Cheng, Culver City, CA (US)

(73) Assignee: Tensorcom, Inc., Culver City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/230,496

(22) Filed: Aug. 4, 2023

(65) Prior Publication Data

US 2023/0378661 A1 Nov. 23, 2023

Related U.S. Application Data

(63) Continuation of application No. 17/001,451, filed on Aug. 24, 2020, now Pat. No. 11,769,954.

(60) Provisional application No. 62/892,271, filed on Aug. 27, 2019.

(51) Int. Cl.

| | |
|---|---|
| ***H01Q 21/06*** | (2006.01) |
| ***H01Q 1/38*** | (2006.01) |
| ***H01Q 1/48*** | (2006.01) |
| ***H01Q 21/00*** | (2006.01) |
| *H01Q 1/24* | (2006.01) |

(52) U.S. Cl.

CPC ............. *H01Q 21/067* (2013.01); *H01Q 1/38* (2013.01); *H01Q 1/48* (2013.01); *H01Q 21/0006* (2013.01); *H01Q 21/0087* (2013.01); *H01Q 1/241* (2013.01)

(58) Field of Classification Search

CPC .......... H01Q 21/067; H01Q 1/38; H01Q 1/48; H01Q 21/0006; H01Q 21/0087; H01Q 1/241; H01Q 1/243; H01Q 9/065; H01Q 9/26; H01Q 21/0075; H01Q 21/08

See application file for complete search history.

(56) References Cited

U.S. PATENT DOCUMENTS

| | | | | |
|---|---|---|---|---|
| 6,211,840 | B1 * | 4/2001 | Wood ..................... | H01Q 9/065 343/793 |
| 8,022,887 | B1 | 9/2011 | Zarnaghi | |
| 8,912,957 | B2 | 12/2014 | Lin | |
| 9,007,272 | B2 | 4/2015 | Balbien et al. | |
| 9,478,873 | B2 | 10/2016 | Balbien et al. | |
| 9,819,098 | B2 | 11/2017 | Gu et al. | |

(Continued)

OTHER PUBLICATIONS

Office Action from corresponding U.S. Appl. No. 17/001,451 dated Aug. 3, 2022.

(Continued)

*Primary Examiner* — David E Lotter

(74) *Attorney, Agent, or Firm* — Harness Dickey & Pierce P.L.C.

(57) ABSTRACT

An antenna array system and a method for making the antenna system. The system includes at least two antenna elements serving as transmitter elements, and at least two antenna elements serving as receiver elements. Each of the transmitter antenna and receiver antenna elements include a pair of curved arms, wherein a first arm in the pair of curved arms is configured to be connected from a signal trace of the antenna system. The second arm in the pair of curved arms is configured to be connected to a ground plane.

20 Claims, 16 Drawing Sheets

(56) References Cited

U.S. PATENT DOCUMENTS

| | | | | |
|---|---|---|---|---|
| 2003/0080919 | A1 | 5/2003 | Forster et al. | |
| 2008/0231521 | A1 | 9/2008 | Anguera Pros et al. | |
| 2012/0235881 | A1 | 9/2012 | Pan et al. | |
| 2013/0082890 | A1 | 4/2013 | Wang et al. | |
| 2014/0364946 | A1 | 12/2014 | Chen | |
| 2016/0103199 | A1 | 4/2016 | Rappaport | |
| 2017/0309991 | A1 | 10/2017 | Noori et al. | |
| 2018/0026341 | A1 | 1/2018 | Mow et al. | |
| 2018/0309198 | A1 | 10/2018 | Yu et al. | |
| 2019/0356058 | A1 | 11/2019 | Martin et al. | |
| 2020/0266523 | A1* | 8/2020 | Park | H01Q 5/371 |
| 2020/0395678 | A1 | 12/2020 | Shamblin et al. | |
| 2021/0098892 | A1* | 4/2021 | Cheng | H01Q 9/26 |

OTHER PUBLICATIONS

Office Action from corresponding U.S. Appl. No. 17/001,451 dated Jan. 4, 2023.

* cited by examiner

100

300

METHOD AND APPARATUS FOR MILLIMETER WAVE ANTENNA ARRAY

CROSS-REFERENCE TO RELATED APPLICATIONS

The present application is a continuation of U.S. patent application Ser. No. 17/001,451, filed Aug. 24, 2020, which claims priority to U.S. Provisional Patent Application No. 62/892,271, filed Aug. 27, 2019. The disclosures of each of the above applications are incorporated herein by reference in their entirety.

TECHNICAL FIELD

In some implementations, the current subject matter described herein generally relates to millimeter wave antennas, and in particular, to an improved antenna array beamforming coverage.

BACKGROUND

Modern communication systems rely on various parameters for transmission of information/signals. Signals are transmitted using antennas in various transmission spectrums. Antenna systems typically include integrated circuits (ICs) that are formed on a semiconductor substrate. Such ICs are able to provide high frequency operation in millimeter wavelength range of frequencies. This range of frequencies occupies the spectrum between 30 to 300 GHz; however, it is not uncommon for frequencies as low as 20 GHz to be identified as millimeter wave. In particular, updates to Wi-Fi, 802.11ad standard, allow for frequencies in the spectrum between 57 and 64 GHz. This technology is sometimes referred to as WiGig. Additional 7 GHz of spectrum between 64 and 71 GHz is allocated for WiGig "like", unlicensed usage. Further, 5G cellular networks may use licensed spectrum at "millimeter" wave frequencies at as low as 24 GHz. Millimeter wave antenna designs require careful consideration of substrate materials, printed circuit board (PCB) stackup, physical layout, and matched impedance with the IC transmit and receive circuits. The physical layout of a properly matched antenna can be used to improve the beamforming coverage of an antenna array.

SUMMARY

In some implementations, the current subject matter relates to an antenna array system. The antenna array system may include at least two antenna elements serving as transmitters and two antenna elements serving as receiver elements. The antenna system may also include a pair of curved arms for at least one of the antenna elements, where one arm may be connected from a signal trace of the antenna system and the other arm may be connected to a ground plane. The antenna array system may be arranged linearly and/or symmetrically. The alignment of the antenna system's element arms and ground planes may be, but are not limited to, linear, semi-circular, and triangular. Further, the antenna system may include a printed circuit board (PCB) having one or more layers, where each layer may have either the same material and/or different material from the other layers. The terms substrate and PCB are used interchangeably herein, and/or may be used to identify one or more individual insulating layers of a PCB, and/or as one or more mounting surfaces for one or more electronic components.

In some exemplary, non-limiting, implementations, the current subject matter relates to an antenna system that may include two transmit elements, two receive elements, a top ground plane, a bottom ground plane, vias connecting the top and bottom ground planes, and a substrate tab which may extend beyond the region of the ground planes and transmit/receive elements. Each of the four transmit/receive elements in the antenna system may include a pair of curved arms and a feed line network. One arm may be connected to a signal and the other arm may be connected to the bottom ground plane. Each of the eight arms may have a semi-circular curved shape. The top ground plane may be rectangular in shape with two rounded, quarter-circular, corners. The bottom ground plane may be shaped similar to the top ground plane. The top and bottom ground planes may be connected using the vias. The antenna elements may have similar dimensions and/or have a linear arrangement. The substrate tab may extend beyond the ground planes and element arms, and may be rectangular in shape. Throughout the antenna region (e.g., ground planes, feed lines, curved arms, and tab), the insulating layers may be made from a common material. The tab region may be configured not have an outer coating, such as, for example, a solder mask.

In some exemplary, non-limiting, alternate implementations, one or more components of the antenna system may include variations in one or more of the following: thickness, area, outline of the ground planes; arrangement of the vias in the feed line region; feed line thickness, length, width, and path; thickness, length, width, and curvature of the arms; tab region thickness, area, and outline; and/or any other variations.

In some exemplary, non-limiting, alternate implementations, the antenna system may include multiple layers of insulating substrate where each layer may be made using a different material. The outline of the ground planes may be rectangular. The outline of the ground planes may have a substantially rectangular shape with four straight sides, where three of the sides may be joined by two quarter-circular curved corners. The outline of the ground planes may have a substantially rectangular shape, straight on three sides, with a curved semi-circular fourth side, and/or the fourth side may have a pie shaped curvature where the curve forms an arc of less than 180° of a complete circle. The ground planes may be rectangular with an additional area attached creating a fourth and fifth side being formed by two straight lines in a triangular shape. The ground planes may have an additional area which is of a trapezoidal shape which may or may not be symmetrical (e.g., a symmetrical isosceles trapezoid). The top and bottom ground planes may be matched in terms of thickness, area, and outline or they may differ from one another in a single or multiple combinations of thickness, area, and outline. The tab region may be rectangular as in the example embodiment or it may have largely rectangular shape with curvature of two corners or of a fourth side. The corner curvature of the tab may be quarter-circular adjoining three straight sides. The tab may be straight on three sides with a fourth side of semi-circular or pie shape. A side of the tab may be trapezoidal. The arms may vary in thickness, area, length, and curvature. The arm curvature may be semi-circular as in the example embodiment or they may have a pie shaped curvature. The curved region of the arms may be the same thickness, varying thickness, or an enclosed area (e.g. a semi-circular area). The arms may protrude in an approximately uniform manner from a fourth, straight, side of the ground plane regions forming a linear arrangement as in the example embodiment. The arms may protrude in an approximately uniform manner from a fourth curved, or a fourth and fifth triangularly shaped, side(s) of the ground planes forming a curved or triangular arrangement. The elements of the antenna system may be grouped with transmit elements separated from the receive elements (e.g., Tx1, Tx2, Rx1, Rx2) and/or may be interleaved in any manner (e.g., Tx1, Rx1, Tx2, Rx2). The arms of the antenna array system may be curved in a similar direction (e.g. Tx1, Tx2, Rx1, and Rx2 signal arms curving in the same direction) or they may be curved in a manner which is symmetric to an axis down the center of the array (e.g., Tx1 and Tx2 of the signal arms curving in an opposite and symmetrical direction as Rx1 and Rx2 signal arms). Additional alternate implementations of the antenna system may include variations described below.

In some implementations, the current subject matter relates to a single multi-layer PCB with an integrated circuit (IC) and an antenna system. The antenna system may include a series of metal traces (e.g., feeding lines and/or signal arm) and one or more ground planes (e.g., with ground arm extension). Each insulating layer of the PCB may be made of different materials (e.g., FR-4, Rogers, FR-2, RF, Flex, PVC, TFE, thermoplastics, plastics, glass, ceramic, etc.).

In some implementations, the ground element may be configured to cover the signal elements using two metal layers. The two ground layers may be connected to each other using vias, and connected to a ground pad or pin of the IC. A ground arm of each antenna element may be connected to one of the ground layers of the ground element. The ground element's outline may be curved. The via may be a connecting metal connected from one ground metal to other ground metal, and/or connected to more metals. The signal line may be a metal which is fully or partially covered by two ground planes (one plane above and one plane below the signal line), and vias.

In some implementations, the substrate may have at least one of the following shapes: a rectangle shape, a semi-circle shape, a quarter circle shape on the corner, and/or any other shape, and/or any combination thereof.

In some implementations, the antenna system may include one or more feeding lines that may have different line width and/or different space of vias for controlling the feeding line impedance. The substrate thickness and material may also be adjusted to control the feeding line impedance.

In some implementations, the antenna elements may have a curved arm with uniform and/or not uniform width. The curve of the arm may have a semi-circle curve and/or pie shape. In some implementations, the antenna elements may have any desired curvature.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some implementations, the current subject matter may provide a millimeter wave antenna array that is capable of generating an enhanced/broad beamforming coverage, as compared to existing antenna systems, such as patch antenna systems, some planar yagi-uda antenna systems, dipole antenna systems, etc., which are typically capable of providing a limited radiation pattern coverage. The current subject matter's millimeter wave antenna array may be easily fabricated on printed circuit board and/or any other multilayer substrate and/or integrated with a complementary metal-oxide-semiconductor (CMOS) chip. Other IC technologies, such as SiGe or GaAs, may also be used for the integrated circuit. In some implementations, the current subject matter may be implemented in various systems/devices, such as, for example, but not limited to, an element to radiate and/or receive radio frequency electromagnetic signals, a 60 GHz WiGig system, a millimeter wave system, a short range frequency modulated continuous wave/continuous wave (FMCW/CW) radar sensor(s), a 5G wireless communication system, a beamforming antenna array system, an endfire antenna for a wireless communication system, mobile telephone(s), smartphone(s), laptop(s), computers, other device for wireless 60 GHz/microwave/millimeter wave band and beamforming/beam scanning applications, a personal area network, a security scanner, a radio telescope, an imaging device, intersatellite communications, a point-to-point communications system, a point-to-multipoint communications system, a ground-based and/or airborne vehicular communications system, a thickness gauge system such as for manufacturing, and/or any other systems, devices, etc.

The band of spectrum between 30 gigahertz (GHz) and 300 GHz is considered to be the millimeter wave band. Millimeter wave is also known as extremely high frequency (EHF) or very high frequency (VHF) by the International Telecommunications Union (ITU). Millimeter waves have short wavelengths in the range from 10 millimeters to 1 millimeter. They have high atmospheric attenuation and are absorbed by gases in the atmosphere, thereby reducing the range and strength of these waves. Further, various atmospheric conditions, such as, rain, moisture (humidity), impact performance and reduce signal strength, which is also known as rain fade. Because of the waves' short range (i.e., approximately one kilometer), millimeter waves travel by line of sight, and thus, its high-frequency wavelengths can be blocked by physical objects (e.g., trees, structures, buildings, etc.).

Figure 1A:
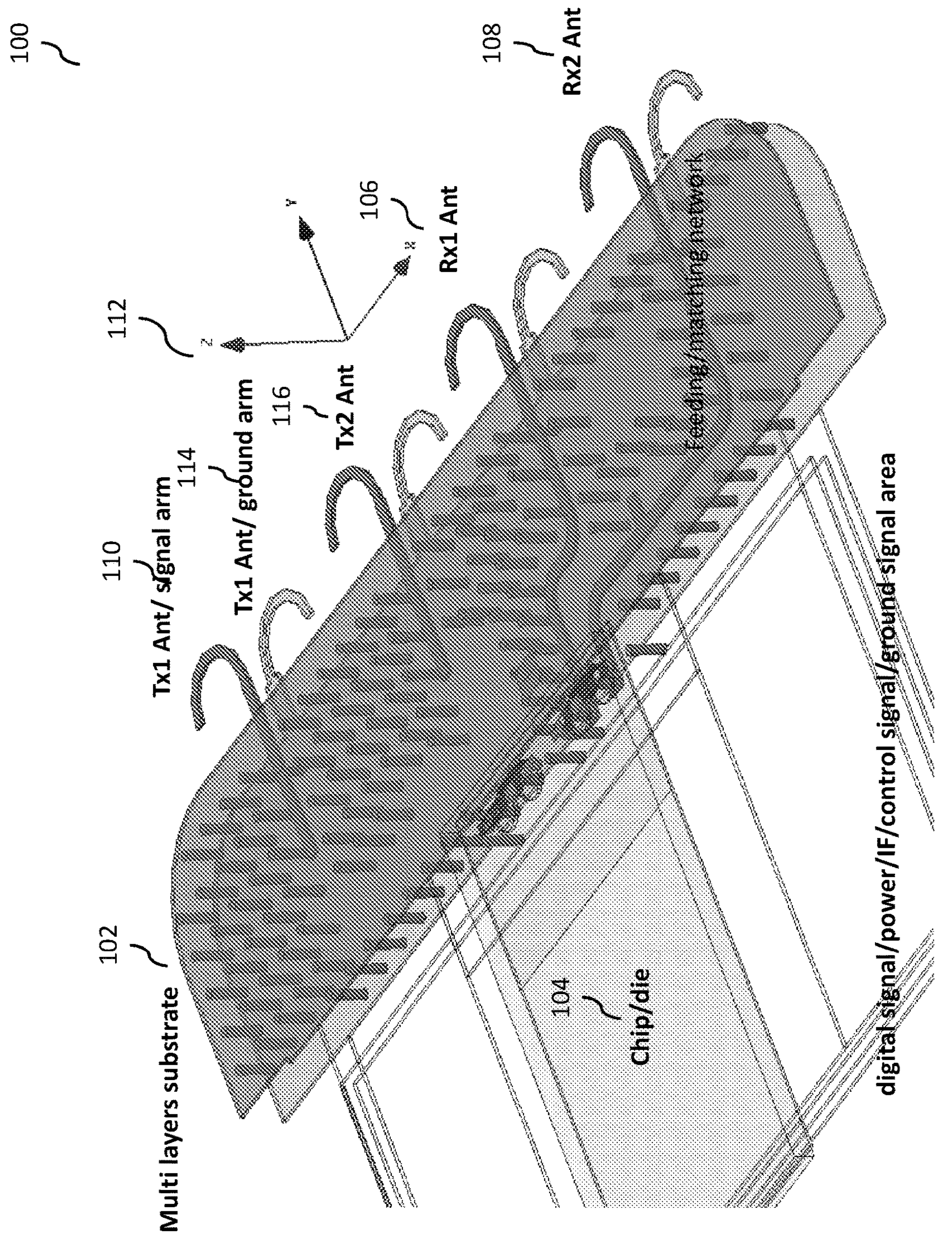
FIGS. 1*a-d* illustrate an exemplary millimeter wave antenna array system, according to some implementations of the current subject matter.
Figure 1B:
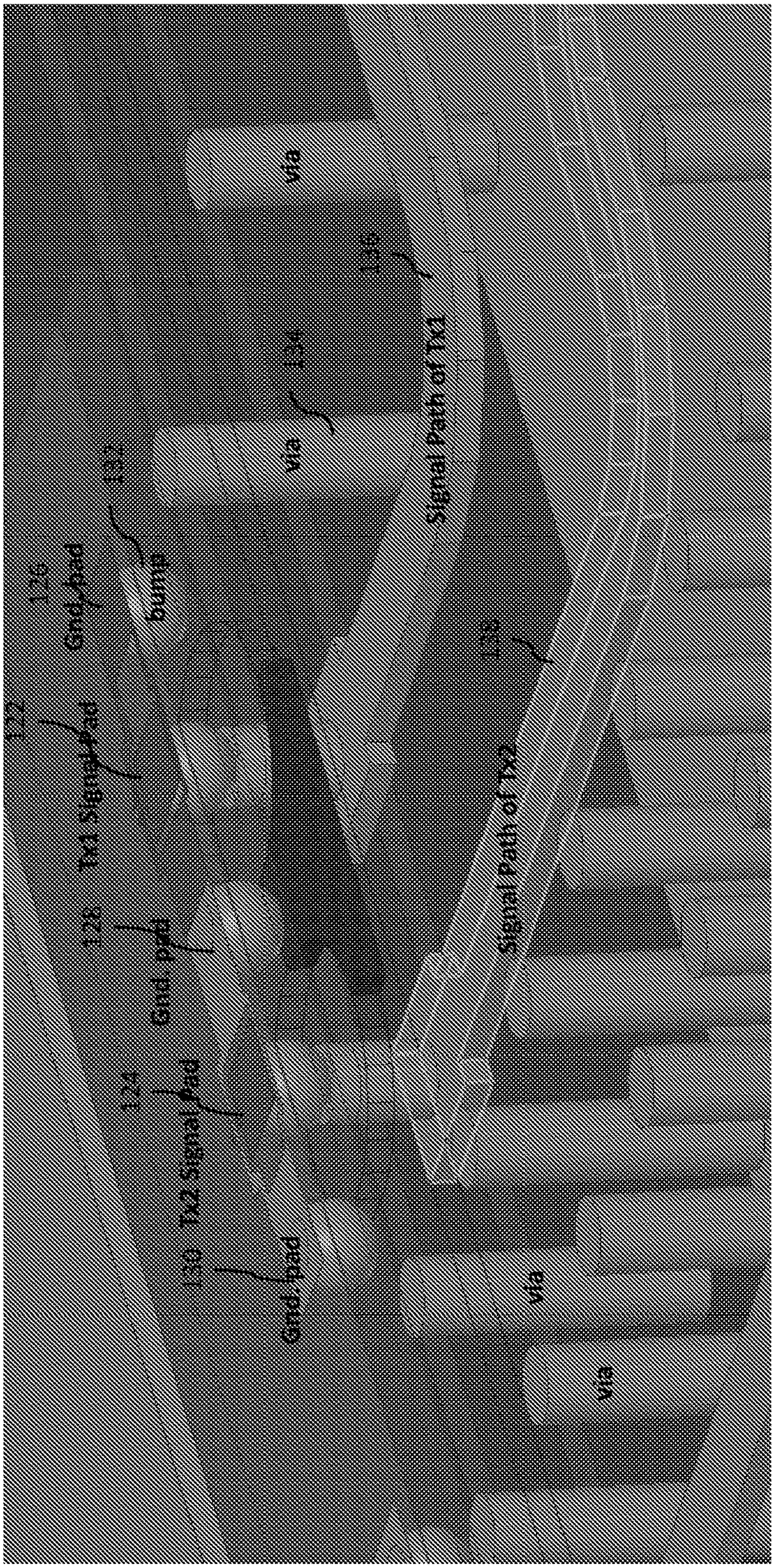
Figure 1C:
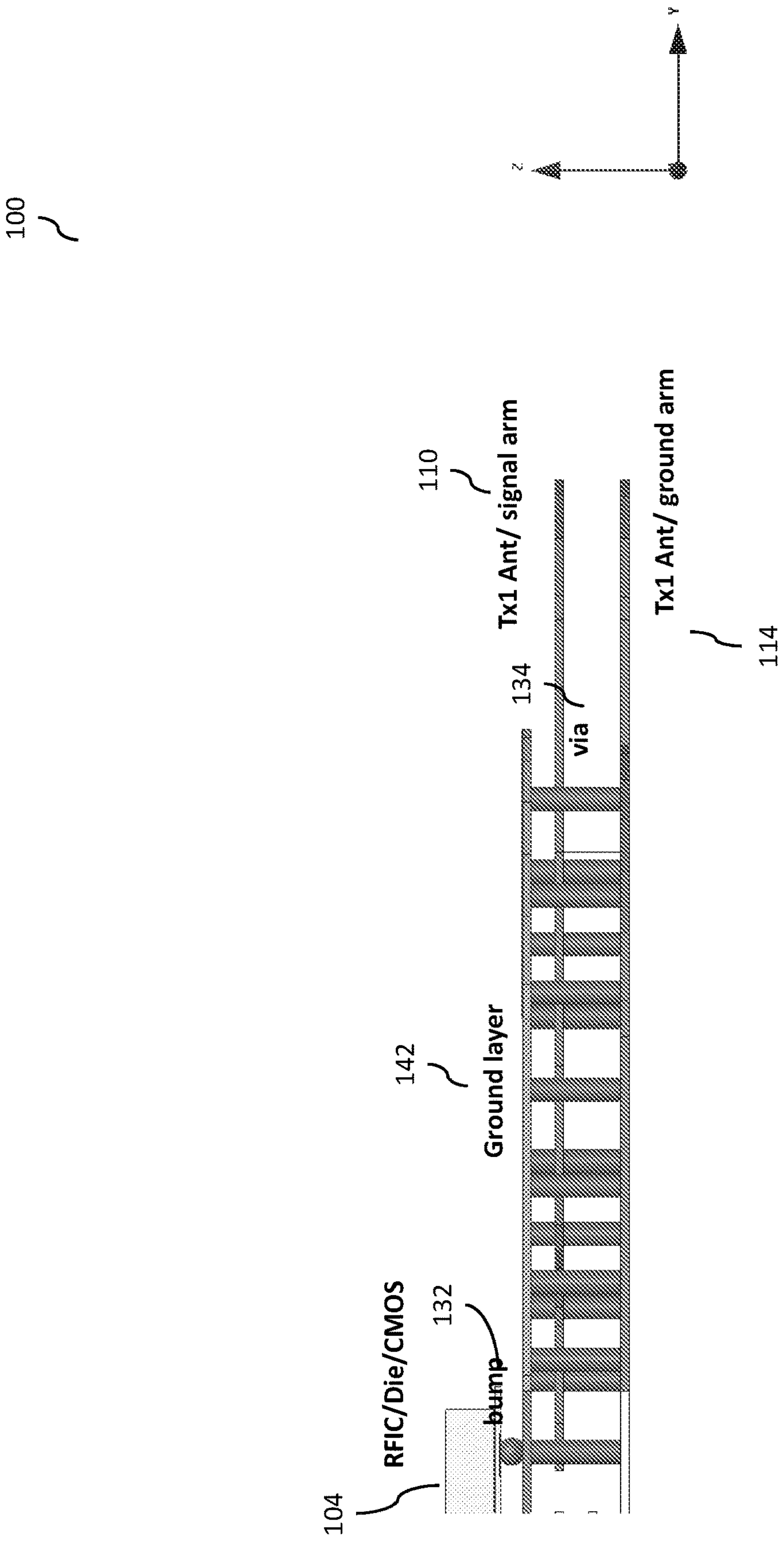
Figure 1D:
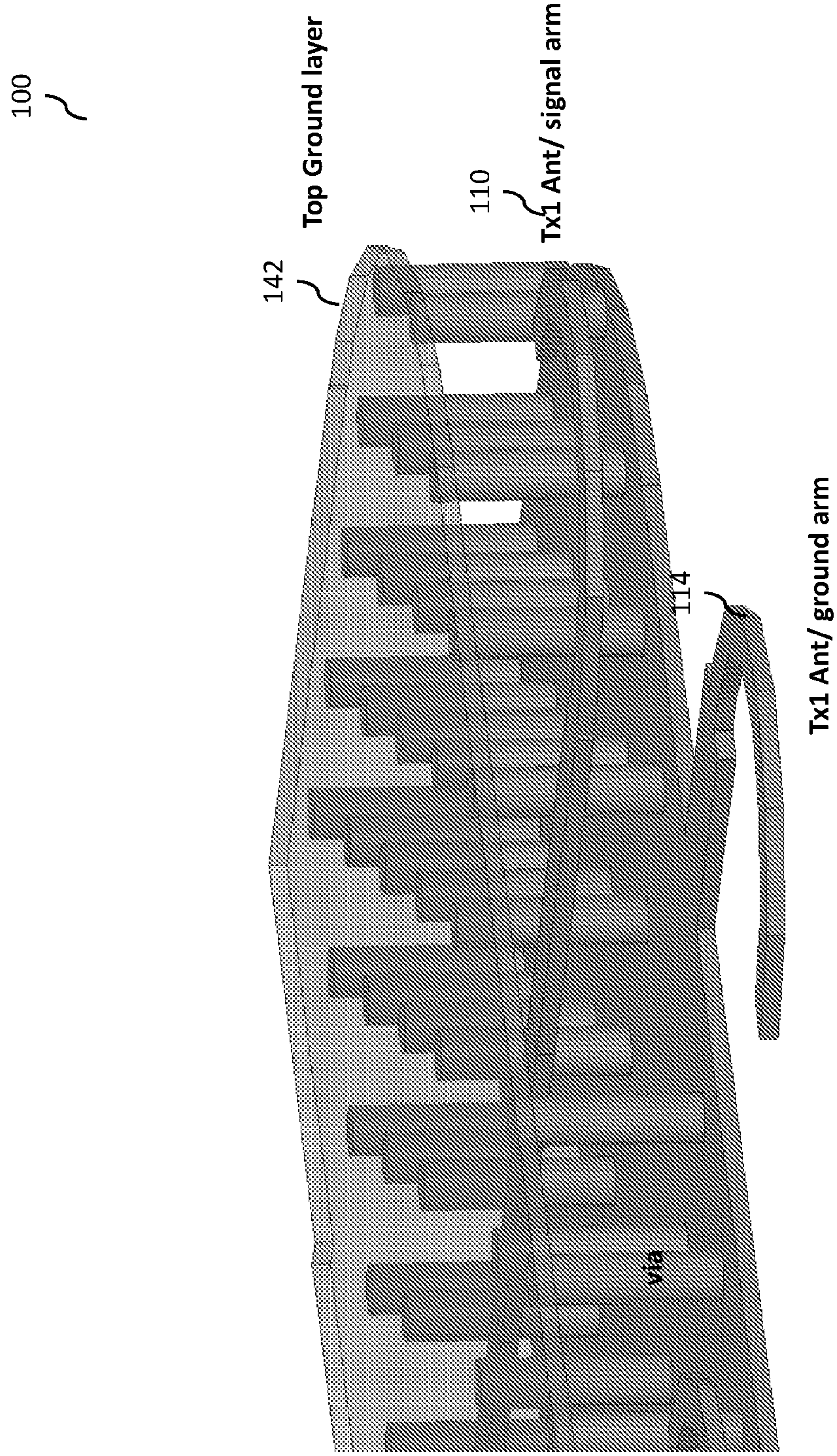

FIGS. 1*a-d* illustrate an exemplary millimeter wave antenna array system 100, according to some implementations of the current subject matter. The system 100 may be an endfire antenna array that may be fabricated on a multi-layer printed-circuit board (PCB) substrate 102 and electrically connected to a chip or a die 104. The electrical interconnect may accomplished using a solder bump similar to that illustrated as bump 132. The IC (chip/die 104) may have variety of signals and interconnect (which may include digital signals, IF signals, control signals, power and ground). The bumps 132 (as shown in FIGS. 1*b* and 1*c*) may connect to top, and/or middle and/or bottom metal layers either directly or through vias. The top, middle, or bottom metal may, for example, be a signal trace, a power plane, or a ground plane. The PCB substrate 102 may include a first receive antenna 106, a second receive antenna 108, a first transmit antenna 112, and a second transmit antenna 116. Each antenna is constructed with a signal and ground arm as exemplified by signal arm 110 and ground arm 114 of a first transmit antenna 112. The antenna system will also have a feeding/matching network. The feeding network may be an interconnect between the signal/ground arms and the IC pads. The feeding network may have a controlled impedance and may be balanced in length.

As shown in FIG. 1B, using the antenna system 100, a signal may be transmitted from the signal pad (e.g., Tx1 signal pad 122, Tx2 signal pad 124) to the second layer metal, and connected to one arm of an antenna (e.g., Tx1 signal may be transmitted using signal path of Tx1 136, and Tx2 signal may be transmitted using signal path of Tx2 138). The ground signal may be interconnected from the ground pad(s) (e.g., Gnd pad 126, Gnd pad 128) to the top layer metal using a bump (e.g., the bump associated with Gnd pad 128) and connected using a via(s) (e.g., via 134) to the bottom ground metal. In general, the ground may form a return path and not necessarily a transmission path. The ground may be connected with one or more vias to the ground plane in order to provide a low inductance, low resistance, and return path.

In some implementations, each metal layer may be insulated using a "substrate" insulating material. There are many material choices having a wide range of cost and performance that may be used for this purpose. In general, an antenna fabricated on a PCB, as discussed herein, may require a substrate with good to high thermal/electrical stability and a low loss. By way of a non-limiting example, FR-4, Rogers, etc. materials may be used.

In some implementations, the antenna system 100 may be compact and may have a wide bandwidth and low voltage standing wave ratio (VSWR). Further, while FIGS. 1*a-d* illustrate an exemplary implementation of 1×4 linear antenna array arrangement, the current subject matter antenna array system are not limited to such one dimensional arrangement. The current subject matter's antenna design may be used as single antenna and/or as multiple M×N antenna array(s), where M and N may be any integer number.

In some implementations, the chip or a die 104 may include a radio frequency integrated circuit (RFIC), and/or any other RF circuitry/chip/die, etc. In some implementations, the chip 104 may be a flip-chip integrated on an additional substrate or mounted directly to top level metal of the PCB as shown in FIG. 1*c*. The bump ball 132 may be used for connection between pads (e.g., pads 122-130 (as shown in FIG. 1B)) on a chip and a metal on the PCB/substrate. Additionally, the antenna signal pad (e.g., pads 122, 124, as shown in FIG. 1B) may be connected to a middle layer using one or multiple vias. As shown in FIG. 1*c*, the IC may be connected to the PCB. In alternate implementations, an IC may be mounted to a different substrate, where that substrate may be mounted to the PCB. A complete assembly may include layers of metal and an insulating material corresponding to a PCB, where each individual layer of insulating material may be a substrate. The antenna signal feed lines may connect to a middle layer metal using vias. In some implementations, the connection may be to the top layer metal which may then be connected to the middle layer metal using a via, e.g., a metal pad may be placed on the top layer metal with a short stub to a via.

While FIGS. 1*a-d* illustrate the PCB/substrate 102 having three metal layers, the current subject matter may have any desired number of metal layers. By way of a non-limiting example, the PCB/substrate 102 may have between one and eleven metal layers. A substrate between each such metal layer may be manufactured from the same and/or different materials, e.g., FR-4, RO4003, RO4350, Teflon, LTCC, duroid, and any other materials that may have low loss tangent properties.

In some implementations, the distance between vias (e.g., vias 134) may be smaller than the free space wavelength to prevent the millimeter wave signal from leaking out and to provide isolation between two transmitter signals (e.g., Tx1 and Tx2), two receiver signals (e.g., Rx1 and Rx2), and isolation between transmitter or receiver signals and the other switching signals on the PCB. For full-duplex systems, the vias may also provide antenna transmit and receive isolation. Sidewalls of via 134 may be metal-coated to achieve an electrical connection. In some exemplary, non-limiting, implementations, the metal coating may be copper, gold, and/or any other conductive metal, and/or any combination thereof.

Figure 2A:
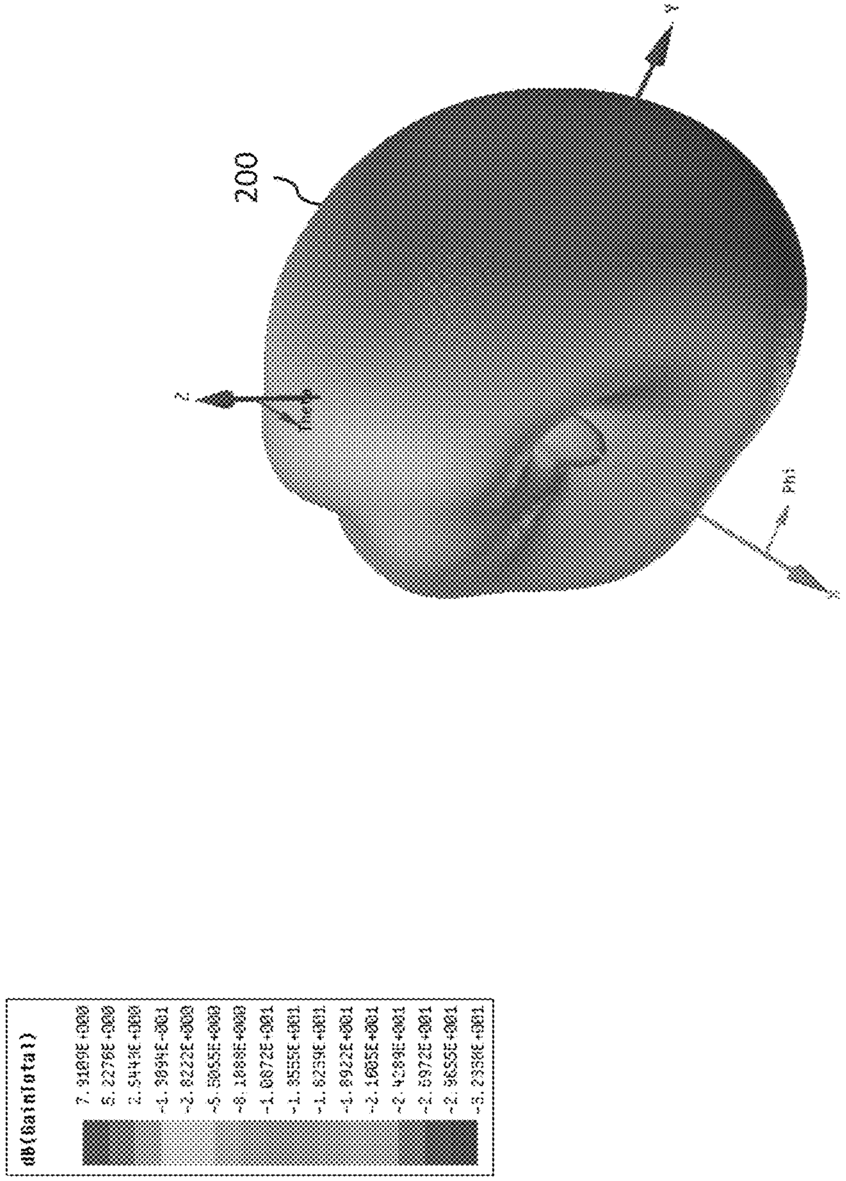
FIG. 2*a* illustrates an exemplary 3D antenna radiation pattern with two antennas (e.g., Tx1 and Tx2 of this exemplary system), each excited with the same signal and the same phase, where the max antenna gain is 8 dBi, according to some implementations of the current subject matter.
Figure 2B:
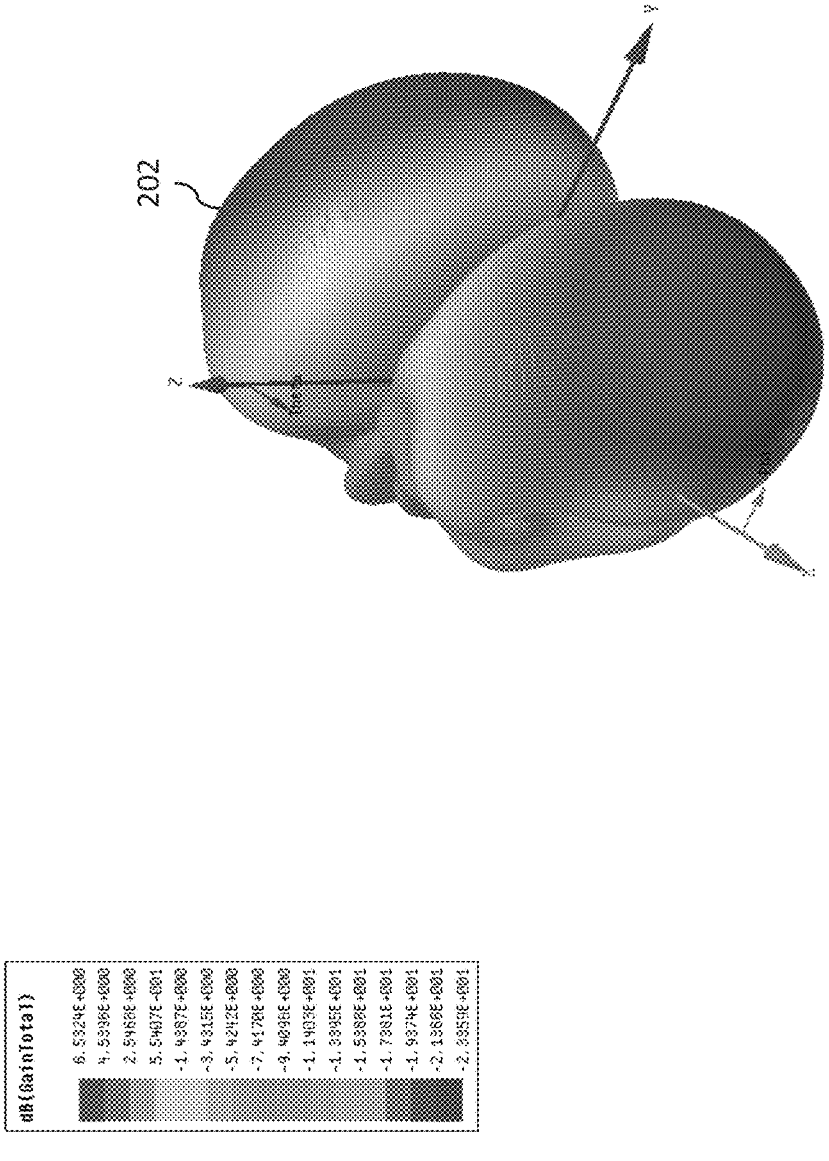
FIG. 2*b* illustrates an exemplary 3D antenna radiation pattern with two antennas (e.g., Tx1 and Tx2 of this exemplary system), each excited with the same signal and different phase (i.e., 180-degree phase delay), thereby providing maximum coverage, according to some implementations of the current subject matter.

In some implementations, the system 100 may also include various low frequency signal components, such as, baseband signal, intermediate frequency (IF) signal, digital control and data signals, DC power, etc. Such components may be placed under the chip 104 and may be separated using via(s) (e.g., via 134) to prevent signal interference. Further, the chip 104 may be configured to generate different amplitude and phase (or time-delayed) signals to each transmit antenna array element (e.g., Tx1, Tx2, etc.), and thus, different antenna radiation patterns may be transmitted by the system 100. Similarly, chip 104 may be configured to apply different amplitude and phase (or time-delay) to each signal from the receive antenna array elements (e.g., Rx1, Rx2, etc.) to steer the direction of the receiver sensitivity patterns. Various circuit components that may or may not be integrated into the chip (e.g., LO, phase rotator, RF phase shifter, etc.) may be used in generating the different antenna phase and radiation/receive patterns. Exemplary radiation patterns are shown in FIGS. 2*a-b*. FIG. 2*a* illustrates an exemplary 3D antenna radiation pattern 200 with two antennas excited with the same in phase signal, where the max antenna gain is 8 dBi. FIG. 2*b* illustrates an exemplary 3D antenna radiation pattern 202 with two antennas excited with the same signal and 180-degree phase delay between the two signal paths, thereby providing the maximum steering angle.

In some implementations, a Tx and Rx antenna may have same or similar transmit/receive patterns. Further, when a phase delay is applied, the patterns may be steered in different directions. The steering may produce additional lobes, as shown in FIG. 2*b*. In some implementations, the receiver gain may be same or similar to the transmitter gain, e.g., 8 dBi. A 180 degree phase shift may be simulated to test a maximum steering angle and/or resulting antenna pattern.

In some implementations, the current subject matter may be configured to implement one or more aspects of a phased array system. A phased array system may be a computer-controlled array of antennas that may electronically steer a generated beam of radio waves to point in different directions without physically moving the antennas. In an antenna array, a transmitted radio frequency current may be fed to individual antennas in the system with a correct phase relationship so that waves from separate antennas may be added to increase radiation in a desired direction and suppress radiation in other unwanted direction(s). In a phased array, the transmitted power may be fed to antennas through computer-controlled phase shifters, which electronically alter phase to steer the beam of radio waves to a different direction. There are two types of phased arrays: a dynamic phased array (active or passive based on a type of amplifier used), which is an array of variable phase shifters for moving the beam, and a fixed phased array (active or passive), where beam's position is stationary with respect to array's face and the entire antenna is moved. The above different types of phase arrays relay on different beamforming techniques. A time-domain beamformer introduces time delays using a delay-and-sum technique that delays an incoming signal from each array element by a predetermined amount of time, and then adds them together. Some frequency beamformers separate different frequency components in the received signal into multiple frequency bins allowing the main lobe to simultaneously point in different directions when different delay and sum beamformers are applied to each frequency bin. Other frequency domain beamformers use of spatial frequency by taking and processing discrete samples from each individual array element to generate multiple different discrete phase shifts, thereby simultaneously forming evenly spaced beams.

In some implementations, the current subject matter may be configured to provide an enhanced range of beam steering through use of curved arms, ground planes, etc., as discussed herein.

Figure 3A:
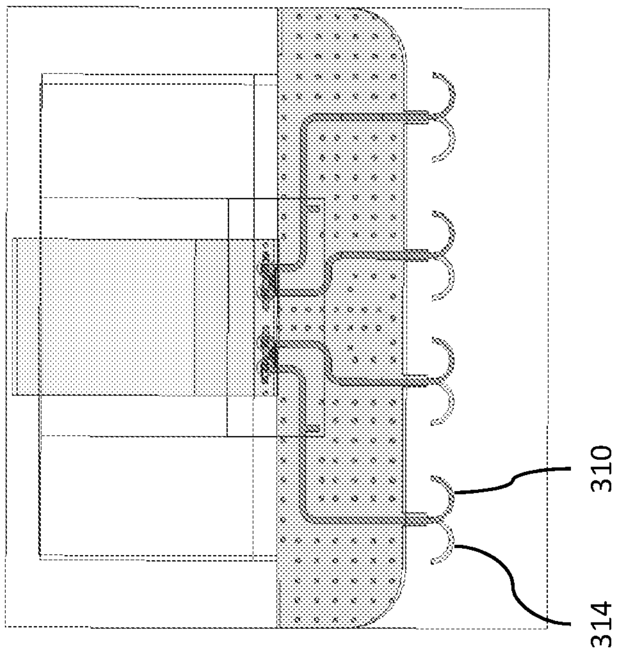
FIGS. 3*a-d* illustrate various exemplary, non-limiting metal shapes of the antenna design in the antenna system shown in FIGS. 1*a-d;*

FIGS. 3*a*-*d* illustrate various exemplary, non-limiting metal shapes of the antenna design in the antenna system 100 shown in FIGS. 1*a*-*d*. For example, FIG. 3*a* illustrates antenna signal arm 310 and ground arm 314 being formed using a semi-circle trace 300. The width of the trace may be uniform, tapered, piecewise linear, and/or any other pattern. The bottom metal may form the other antenna arm and may be disposed in any desired relation to the signal arm. For example, as shown in FIG. 3*a*, directions of curvature of the arms 310 and 314 may be opposite to one another about an axis that is parallel to the plane of the layers. Alternatively, the directions of curvatures of the arms 310 and 314 may mirror each other. In some implementations, the curvatures of all arms 310 may curve in the same direction or different directions. Similarly, the curvatures of all arms 314 may curve in the same or different directions.

Figure 5:
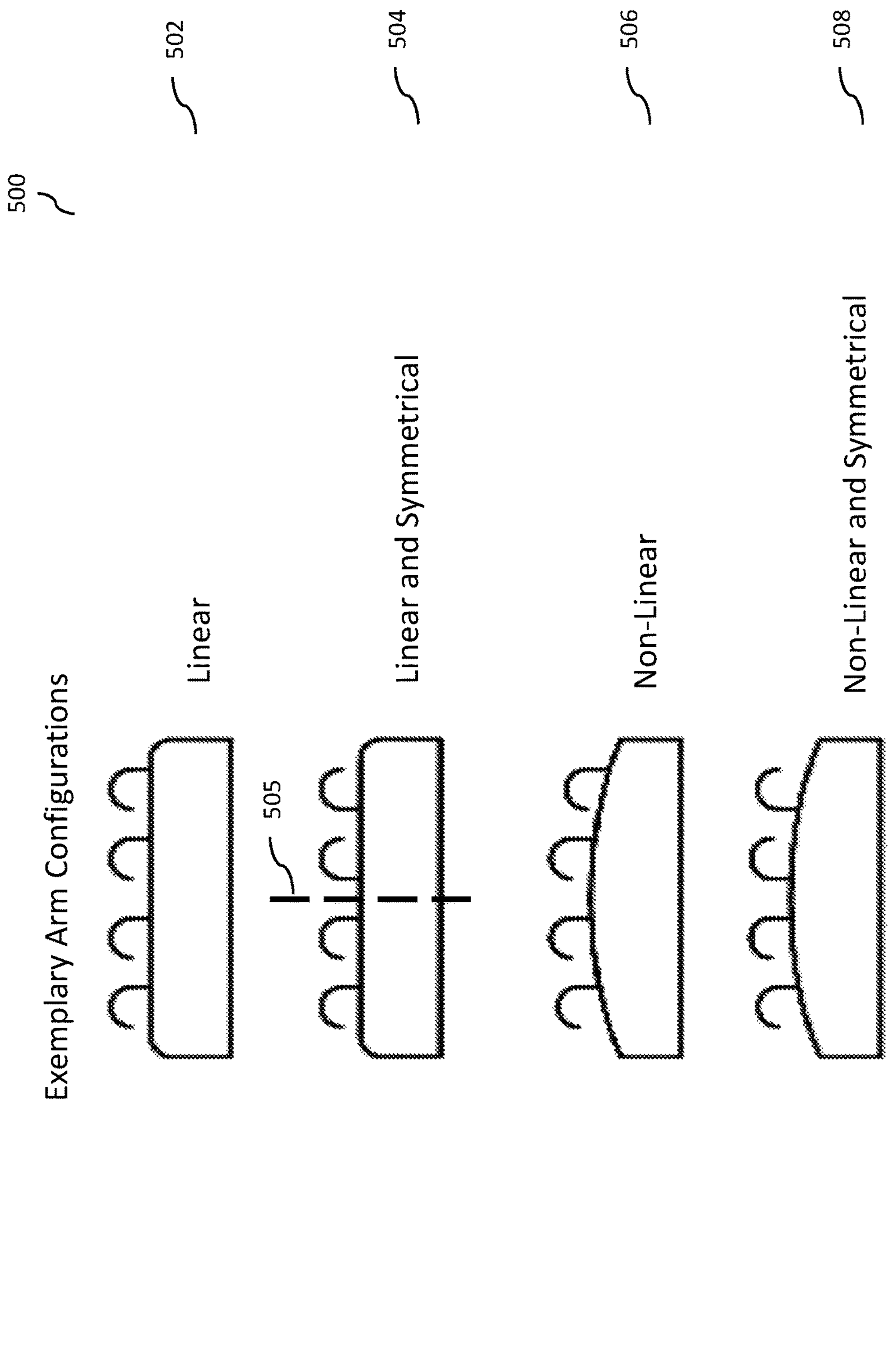
FIG. 5 illustrates various exemplary arrangements of signal arms, according to some implementations of the current subject matter.

Exemplary arm configurations or arrangements 502-508 of the arms 310 and/or 314 are shown in FIG. 5. Configuration 502 illustrates a linear (e.g., in the same plane) configuration of the arms (e.g., ground arms, antenna arms, and/or both), whereby curvatures of all arms may be configured to curve in the same general direction. As can be understood, the radius of the curvature of each arm may vary and/or may be the same. Configuration 504 illustrates a linear and symmetrical configuration of the arms (e.g., ground, antenna, and/or both), whereby directions of curvatures of two of the arms are different from directions of curvatures of two other arms (i.e., symmetrical about an axis 505). Configuration 506 illustrates a non-linear arrangement of the arms (e.g., ground, antenna, and/or both). Non-linear arrangement may be due to the plane (e.g., ground plane), from which the arms are extending, being curved or pie-shaped, as shown in the configuration 506. Here, the directions of curvatures of the arms may be similar to the configuration 502, i.e., pointing in the same general direction. As can be understood, the radius of curvature of each arm may be different and/or same with respect to the other arms. Configuration 508 illustrates a non-linear (similar to configuration 506) and symmetrical arrangement (similar to configuration 504) of the arms. As can be understood, the configurations of the antenna arms are not limited to those shown in FIG. 5, e.g., the non-linear arrangement may include an irregular shaped plane, where arms may be arrangement symmetrically, anti-symmetrical, and/or in any other fashion.

Figure 3B:
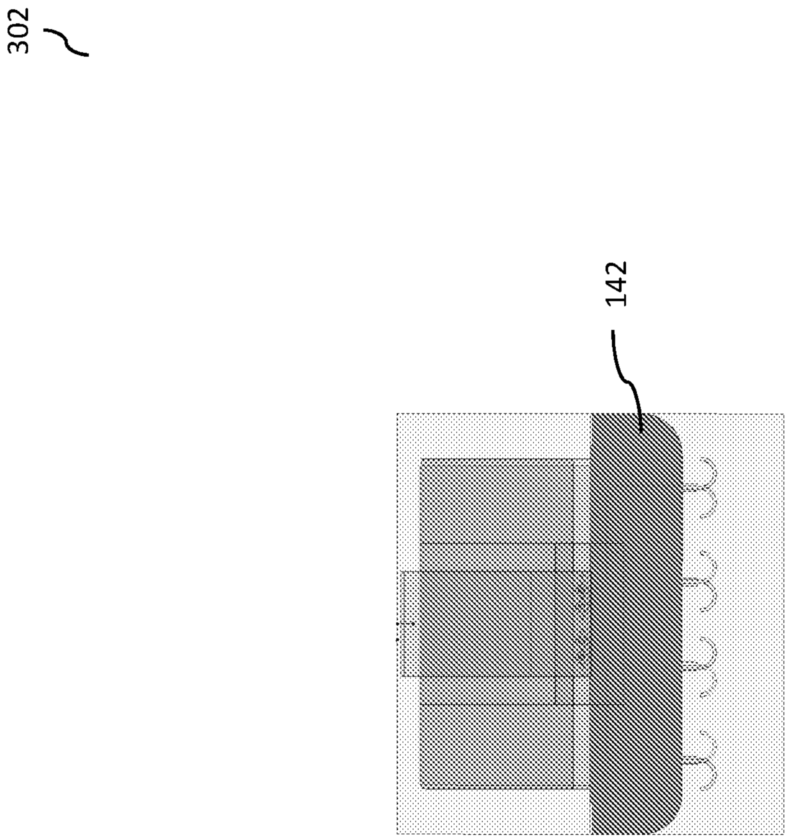
Figure 3C:
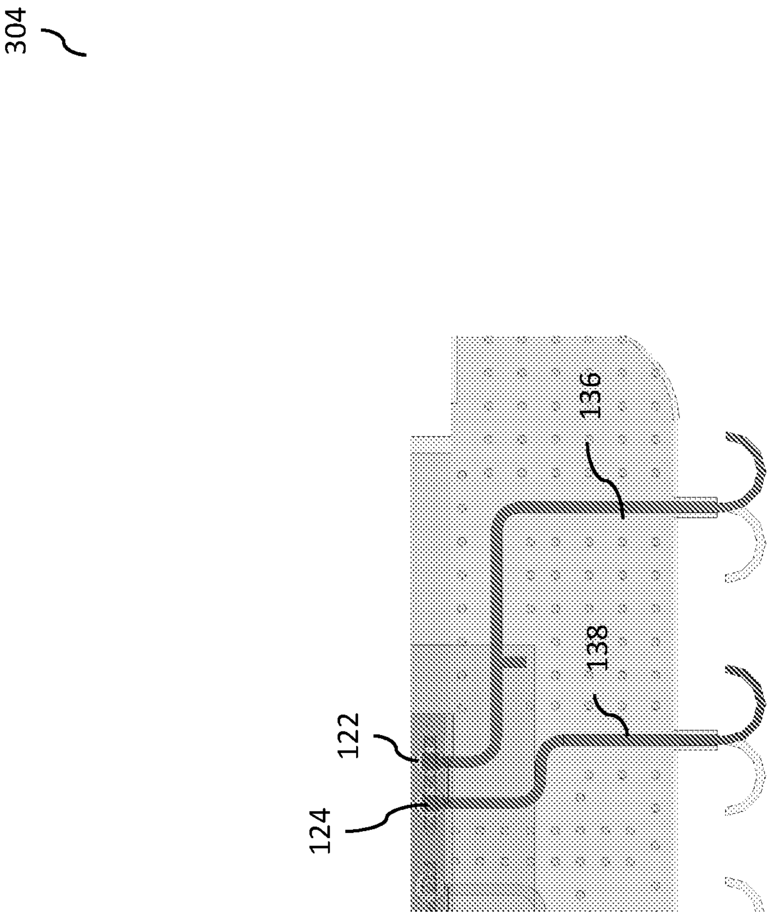
Figure 3D:
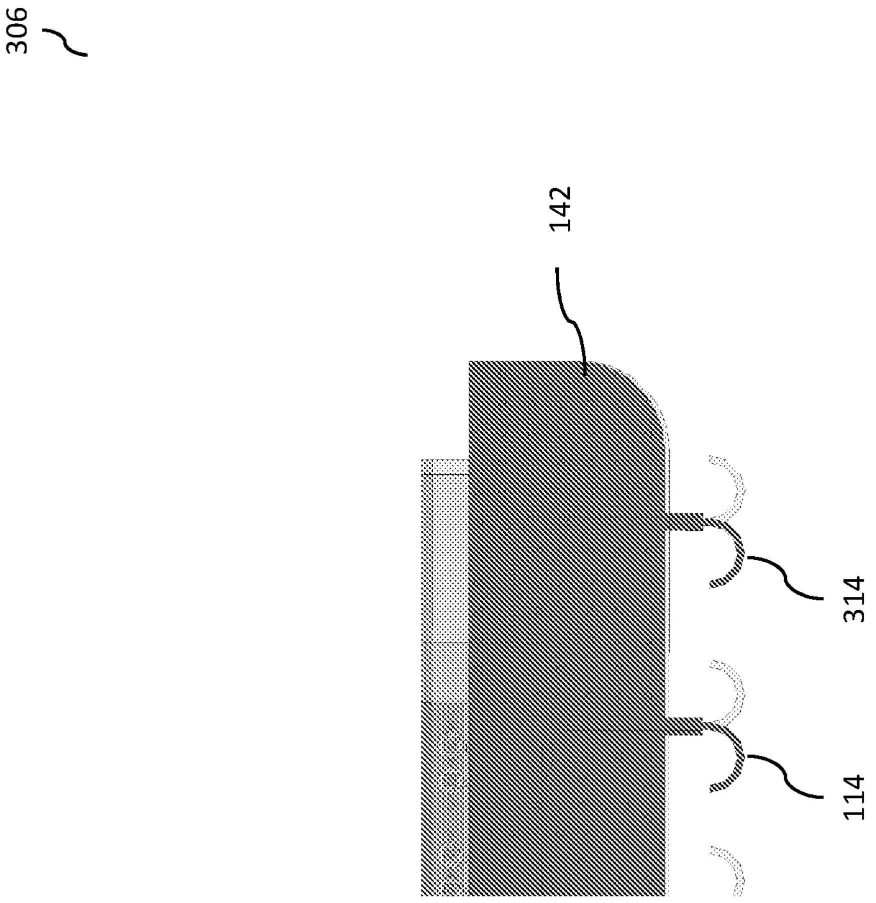

In some implementations, referring back to FIG. 3*a*, the antenna arms may also be formed using a top metal. In some exemplary, non-limiting, implementations, the signal and ground arms 310, 314 may be "flipped" 180 degrees from one another (e.g., different layers may form the arms, directions of curvatures from one arm 310 to another arm 310, from one arm 314 to another arm 314, as well as between arms 310 and 314 may vary). Variations of arrangements of arms may be implemented to provide an enhanced beam steering coverage and/or flexibility. Curved corners of the ground plane covering the feed line region may be included to improve the range of beam steering. FIGS. 3*b*-*d* illustrate additional details of the antenna system 100 shown. In particular, FIG. 3*b* illustrates an exemplary portion of the curved corner top layer ground metal 142. FIG. 3*c* illustrates exemplary transmission signal arms (paths 136, 138) and a portion of the associated feedline network(s) (pads 122, 124) for the system 100. FIG. 3*d* illustrates a portion of the curved corner bottom layer ground metal 142 with connected ground arms 114, 314.

Figure 4A:
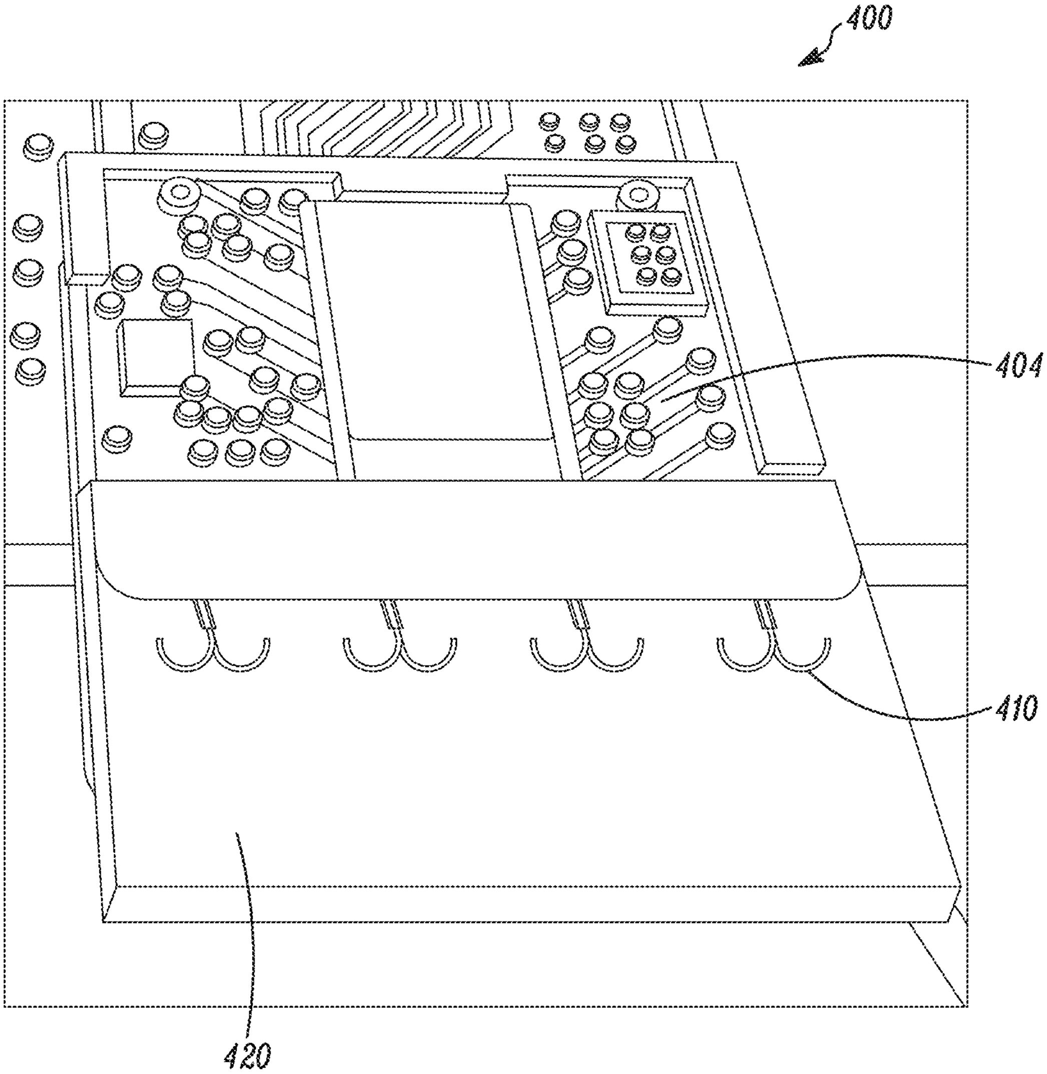
FIGS. 4*a-c* illustrate an exemplary millimeter wave antenna array system, according to some implementations of the current subject matter.
Figure 4B:
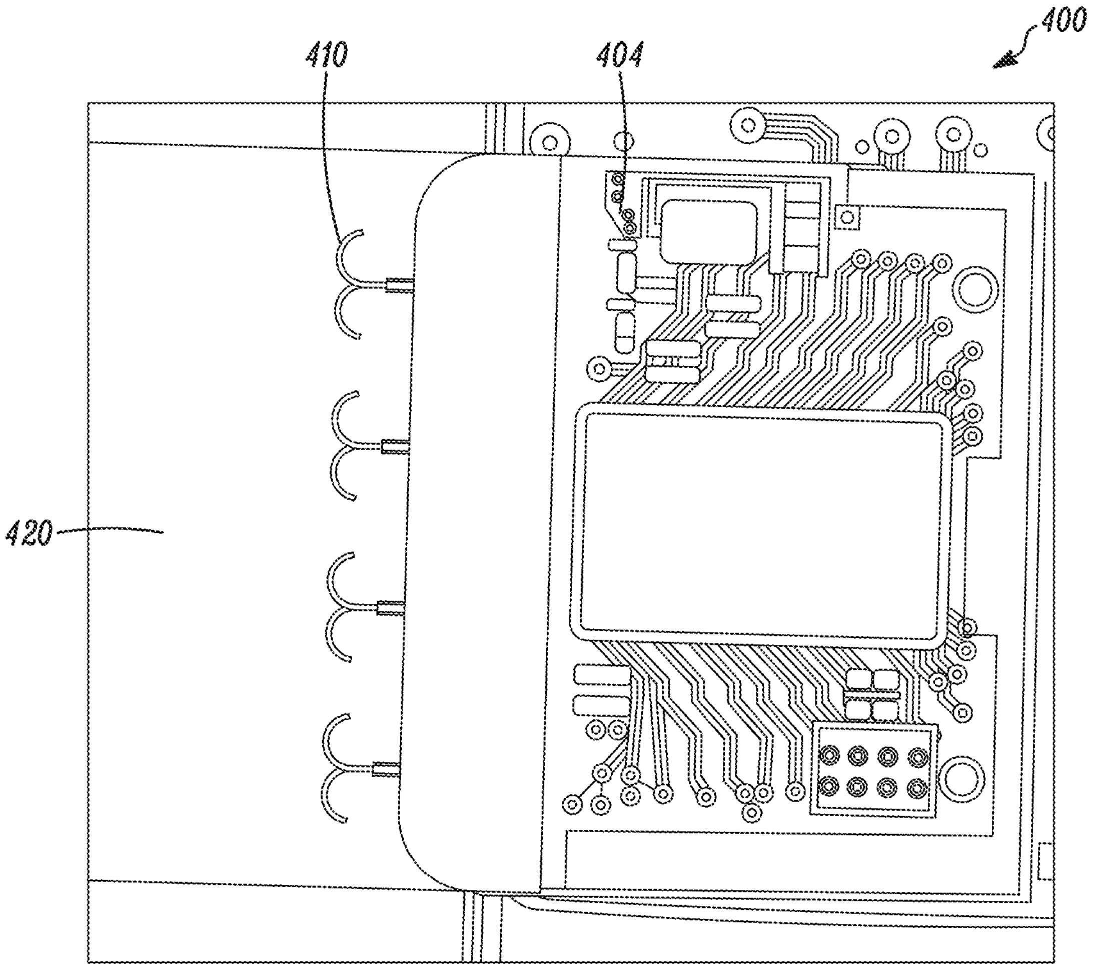
Figure 4C:
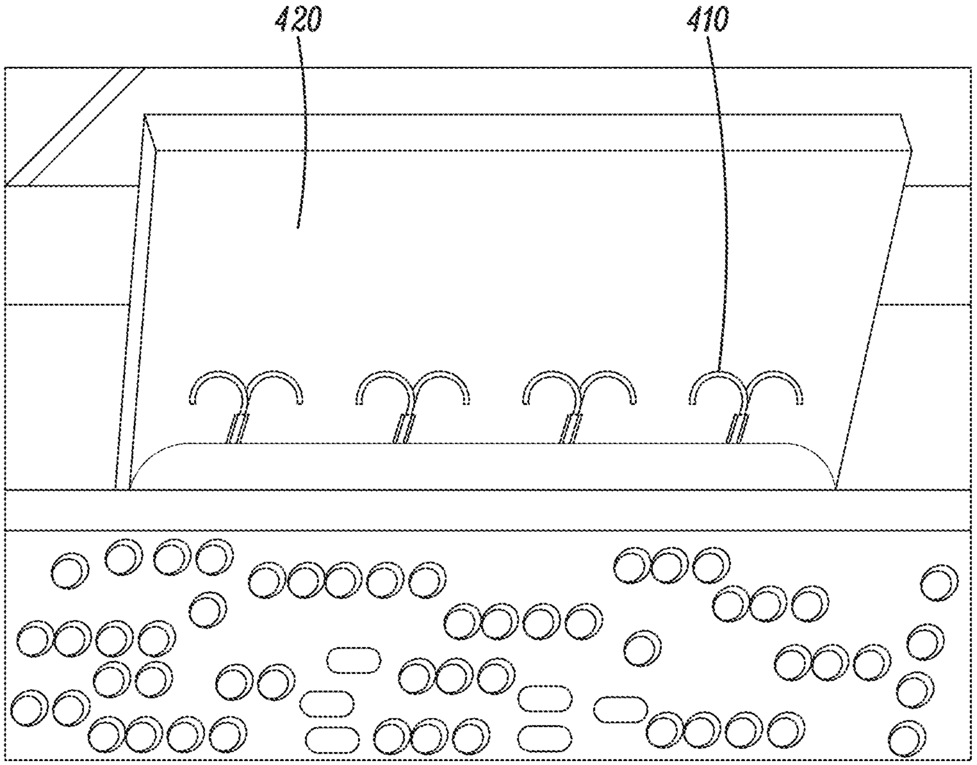
Figure 6:
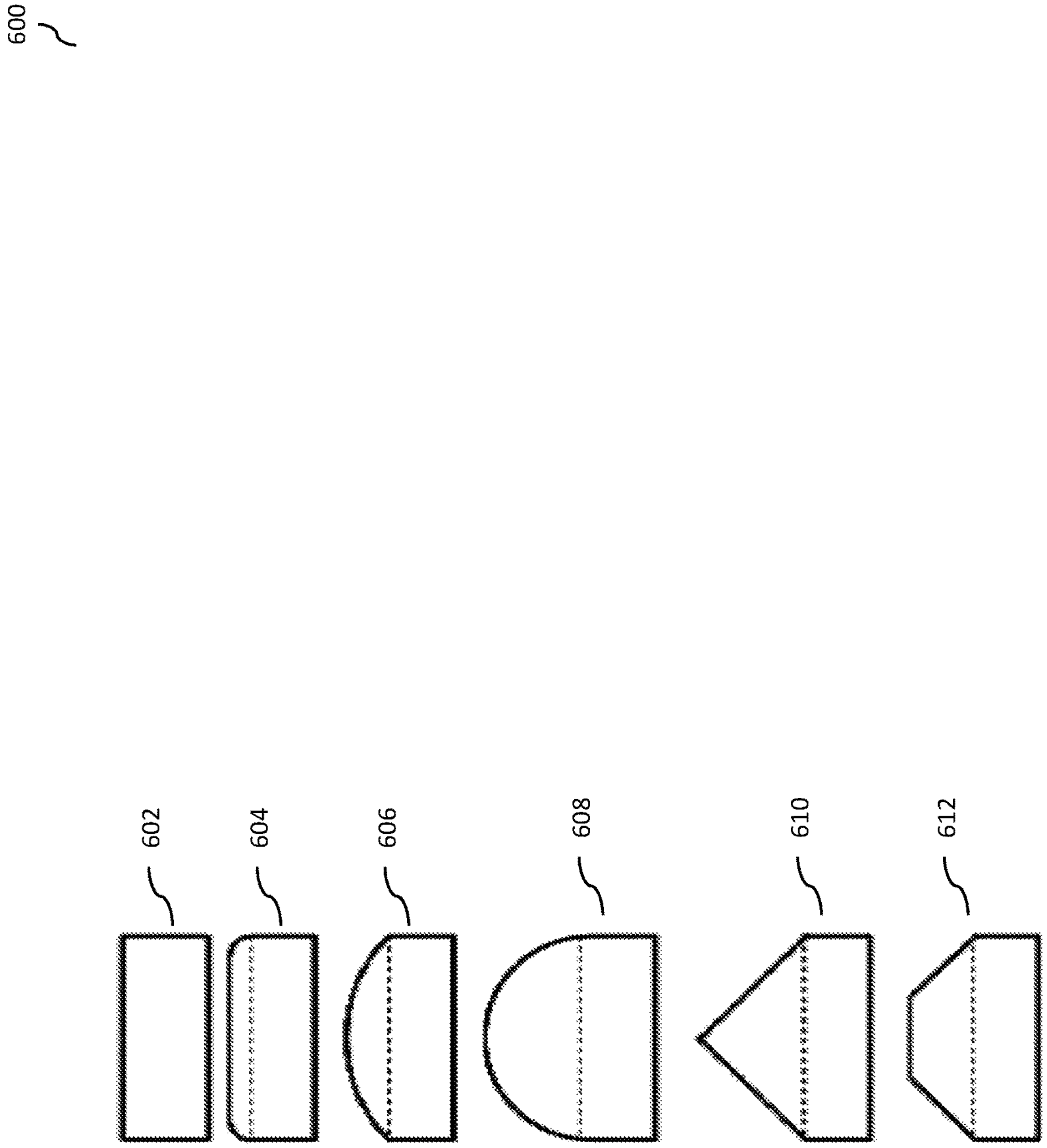
FIG. 6 illustrates exemplary configurations of tab end and ground plane, according to some implementations of the current subject matter.

FIGS. 4*a*-*c* illustrates an exemplary antenna system 400, according to some implementations of the current subject matter. The antenna system 400 may be similar to the antenna systems shown in FIGS. 1*a*-3*d* and discussed above. The antenna system 400 may include a PCB 404, one or more curved Tx/Rx/Gnd arms 410 and a tab 420. The system 400 may include additional components similar to those discussed above in connection with FIGS. 1*a*-3*d*. The tab 420 may be an extension of the PCB 404 (e.g., without top, middle, or bottom metal and without a protective solder mask coating). The tab 420 may be configured to provide an antenna gain. In some exemplary implementations, tab's edges may also be curved (exemplary curved configurations are shown in FIG. 6). The Tx/Rx/Gnd arms 410 may be configured to be embedded (e.g., partially or completely) in the tab 420.

FIG. 6 illustrates exemplary configurations of tab end and ground plane. Configuration 602 illustrates a rectangular arrangement that may be used for the tab end. Configuration 604 illustrates a generally rectangular arrangement having curved or circular ends (quarter-circular), which may be used for ground planes. Configuration 606 is a rectangle having a pie-shaped or arcuate side (e.g., less than 180 degrees arc) and configuration 608 is also a rectangle with an arcuate side, where the arc is more than 180 degrees. These configurations may be used for the ground plane and/or the tab end. Configuration 610 is a triangular arrangement (that may be used for fourth and/or fifth sides) and configuration 612 is a trapezoidal arrangement (that may be used for fourth, fifth and/or sixth sides).

In some implementations, the current subject matter relates to an antenna array system. The antenna array system may include at least two antenna elements serving as transmitters and two antenna elements serving as receiver elements. The antenna system may also include a pair of curved arms, where one arm may be connected from a signal trace of the antenna system and the other arm may be connected to a ground plane. The antenna array system may have a linear arrangement, a non-linear arrangement, a linear and symmetrical arrangement, and/or a non-linear and symmetrical arrangement. Further, the antenna system may include a PCB having multiple metal and substrate layers, where each substrate layer may be either the same material and/or different material from the other layers.

In some implementations, the ground element may be configured to cover the signal elements using two metal layers and may be connected using vias to a ground portion of one of the transmitter antenna elements. The ground element's outline may be curved. The vias may be a connecting metal connected from one ground metal to other ground metal, and/or connected to more metals. The signal line may be a metal covered by two ground plane on the top and ground and vias.

In some implementations, the substrate may have at least one of the following shapes: a rectangle shape, a semi-circle shape, a quarter circle shape on the corner, a pie-shaped, a triangular shape, and a trapezoidal shape and/or any other shape, and/or any combination thereof.

In some implementations, the antenna system may include one or more feeding lines that may have different line width and different space of surrounding vias for controlling the feeding line impedance.

In some implementations, the antenna elements may have a curved arm with uniform and/or not uniform width. The curve of the arm may have a semi-circle curve and/or pie shape. As can be understood, any curvature/shaped areas of metal may be used for signal/ground arms for the purposes of providing an enhanced beam steering coverage.

Figure 7:
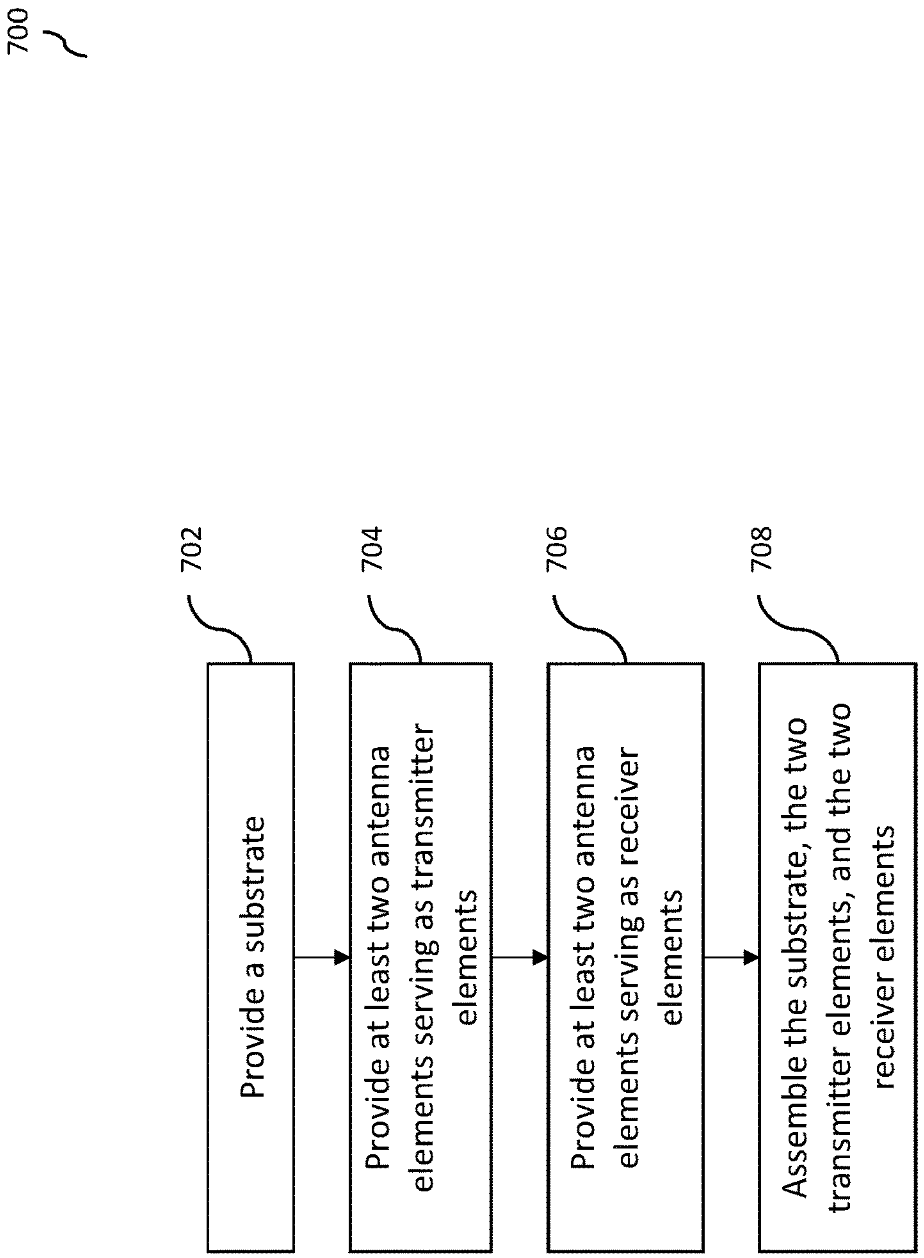
FIG. 7 illustrates an exemplar method of making an antenna array system, according to some implementations of the current subject matter

In some implementations, the current subject matter relates to a method for making an antenna system, as shown in FIG. 7. At 702, a substrate may be provided. At 704, at least two antenna elements serving as transmitter elements may be provided. At 706, at least two antenna elements serving as receiver elements may also be provided. Each of the two transmitter antenna elements and the two receiver elements may include a pair of curved arms, wherein a first arm in the pair of curved arms may be configured to be connected from a signal trace of the antenna system. The second arm in the pair of curved arms may be configured to be connected to a ground plane. At 708, the substrate, the two transmitter elements, and the two receiver elements may be assembled.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

What is claimed:

1. An antenna array system, comprising:

a ground plane;

a signal trace;

at least two transmit antenna elements each including a first transmit curved arm and a second transmit curved arm, the first transmit curved arm connected to the signal trace and the second transmit curved arm connected to the ground plane;

at least two receive antenna elements including a first receive curved arm and a second receive curved arm, the first receive curved arm connected to the signal trace and the second receive curved arm connected to the ground plane; and a chip configured to generate different amplitude and phase signals to each of the at least two transmit antenna elements to transmit different antenna radiation patterns.

2. The antenna array system of claim 1, wherein the chip is configured to apply different amplitude and phase to each signal from the at least two receive antenna elements to steer a direction of receiver sensitivity patterns.

3. The antenna array system of claim 1, wherein each first transmit curved arm has a direction of curvature that is symmetrical about an axis with respect to a direction of curvature of each first receive curved arm.

4. The antenna array system of claim 1, wherein the at least two transmit antenna elements and the at least two receive antenna elements are positioned in a linear arrangement with respect to one another.

5. The antenna array system of claim 1, wherein the at least two transmit antenna elements and the at least two receive antenna elements are positioned in a non-linear arrangement with respect to one another.

6. The antenna array system of claim 1, further comprising a ground element including two metal layers covering at least a portion of one or more of the at least two transmit antenna elements, and at least a portion of one or more of the at least two receive antenna elements, wherein the two metal layers are connected using one or more vias.

7. The antenna array system of claim 1, wherein the ground plane has a curved outline.

8. The antenna array system of claim 1, further comprising a substrate, the substrate defining a rectangular shape, a semi-circular shape, a quarter-circular shape, a pie shape, a triangular shape, or a trapezoidal shape.

9. The antenna array system of claim 1, further comprising one or more feeding lines, the one or more feeding lines having different line widths and/or the antenna array system including a plurality of surrounding vias configured to control an impedance of the one or more feeding lines.

10. The antenna array system of claim 1, wherein each first transmit curved arm has a uniform width.

11. The antenna array system of claim 1, wherein each first transmit curved arm has a non-uniform width.

12. The antenna array system of claim 1, wherein each first transmit curved arm has a semi-circular shape or a pie shape.

13. A method of making an antenna array system including a ground plane, a signal trace, at least two transmit antenna elements and at least two receive antenna elements, the method comprising:

connecting a first transmit curved arm of each transmit antenna element to a signal trace;

connecting a second transmit curved arm of each transmit antenna element to the ground plane;

connecting a first receive curved arm of each receive antenna element to the signal trace; and connecting a second receive curved arm of each receive antenna element to the ground plane;

wherein the at least two transmit antenna elements and the at least two receive antenna elements are positioned in a non-linear arrangement with respect to one another.

14. The method of claim 13, wherein each first transmit curved arm has a direction of curvature that is symmetrical about an axis with respect to a direction of curvature of each first receive curved arm.

15. The method of claim 13, further comprising covering at least a portion of one or more of the at least two transmit antenna elements, and at least a portion of one or more of the at least two receive antenna elements, with two metal layers of a ground element.

16. The method of claim 15, further comprising connecting the two metal layers with one or more vias.

17. The method of claim 13, wherein the ground plane has a curved outline.

18. The method of claim 13, further comprising assembling each transmit antenna element and each receive antenna element with a substrate, the substrate defining a rectangular shape, a semi-circular shape, a quarter-circular shape, a pie shape, a triangular shape, or a trapezoidal shape.

19. The method of claim 13, wherein each first transmit curved arm has a uniform width.

20. The method of claim 13, wherein each first transmit curved arm has a non-uniform width.

* * * * *